United States Patent [19]
Jeannet et al.

[11] 3,851,397
[45] Dec. 3, 1974

[54] MICROMETER WITH DIGITAL READING

[75] Inventors: Jean-Pierre Jeannet, Lausanne; Jean-Pierre Leuba, Renens, both of Switzerland

[73] Assignee: Tesa S. A., Renens, Switzerland

[22] Filed: Aug. 6, 1973

[21] Appl. No.: 386,177

[30] Foreign Application Priority Data
Sept. 24, 1972 Switzerland............... 13916/72
June 25, 1973 Switzerland............... 9234/73

[52] U.S. Cl. ............................................ 33/166
[51] Int. Cl. ............................................ G01b 3/18
[58] Field of Search ........................... 33/166, 164 R

[56] References Cited
UNITED STATES PATENTS
626,876  6/1899  Spalding et al. ............... 33/166
2,707,834  5/1955  Zuckerman ..................... 33/166
3,474,958  10/1969  Meyer .......................... 235/1 C FOREIGN PATENTS OR APPLICATIONS
657,046  10/1963  Italy ........................... 33/166

Primary Examiner—Samuel B. Rothberg
Assistant Examiner—John W. Shepperd
Attorney, Agent, or Firm—Heilman, Heilman & Casella

[57] ABSTRACT

This invention relates to a micrometer with digital reading comprising a micrometer screw, a body axially fixed to said micrometer screw and angularly fixed relative thereto, and a rotary member carrying figures and arranged in said body in front of a window thereof.

9 Claims, 6 Drawing Figures

MICROMETER WITH DIGITAL READING

The present invention has for its object a micrometer with digital reading comprising a micrometer screw movable in engagement in a fixed support and a body which is axially fixed to said micrometer screw, said body being angularly fixed relative to the micrometer screw and provided with at least one window, characterised in that it comprises a cylindrical member mounted in rotary manner in the body and axially fixed thereto whereby at least one part of said cylindrical member is arranged facing the window of the body and carries on its periphery at least one series of numbers, means being provided so that any axial displacement of the micrometer screw brings about the rotation of the cylindrical member in the body.

The attached drawings show as examples three embodiments of the object of the invention.

FIG. 6 is a part longitudinal section of a variant of the embodiment of FIG. 1.

Figure 1:
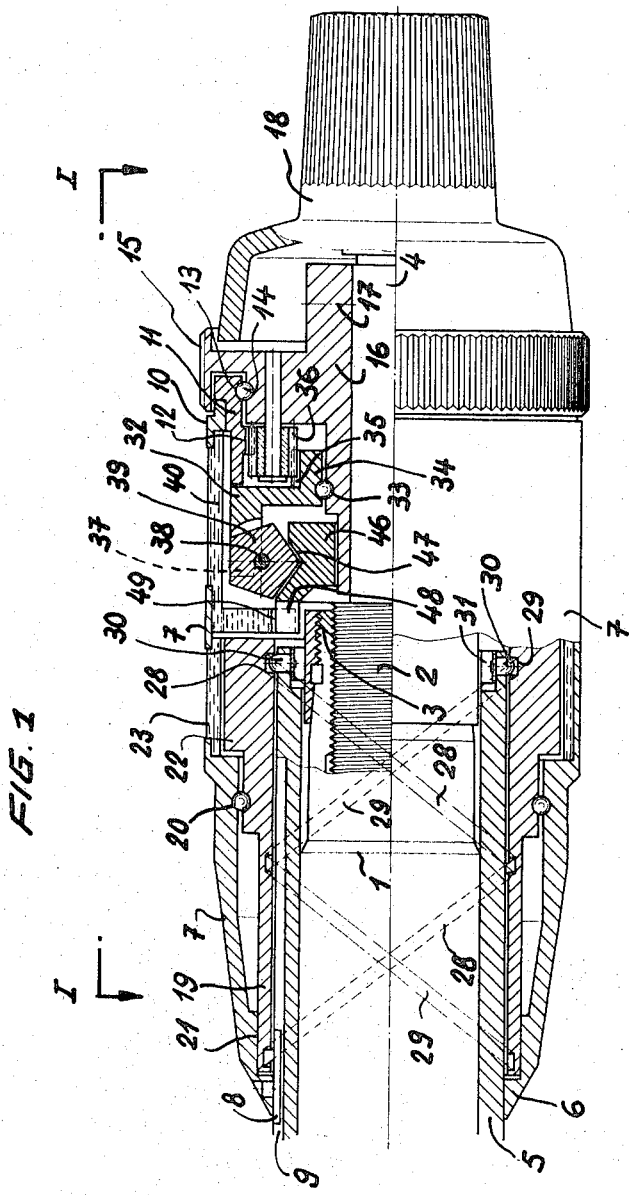
FIG. 1 is a part longitudinal section of the first embodiment.
Figure 2:
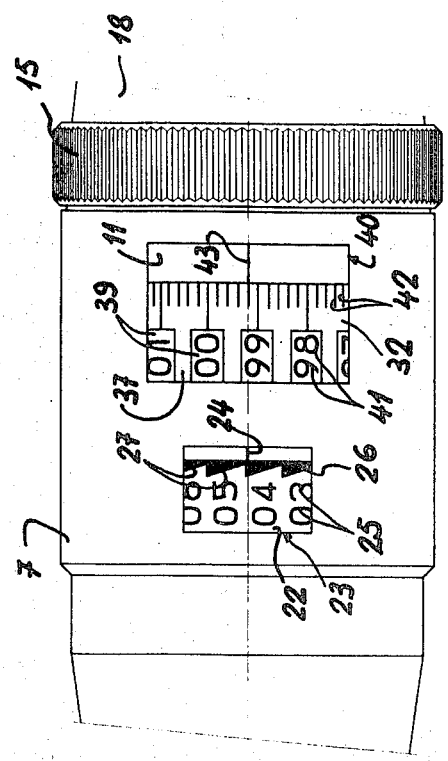
FIG. 2 is a view along I—I of FIG. 1.
Figure 3:
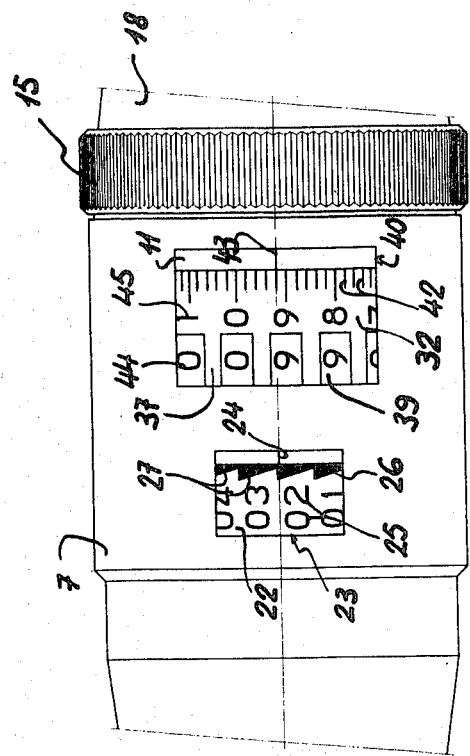
FIG. 3 represents a variant in part viewed from above.

The micrometer shown in FIGS. 1 to 3 comprises in known manner a guidance tube 1 wherein is centred in engagement a micrometer screw 2, the meshing of the micrometer screw 2 in guidance tube being controlled by a system 3 for taking up the play which is also known and will not be described. The micrometer screw 2 is extended by a rear pivot 4 and a front pivot not shown and controlling the movable key or keys of the instrument.

To the guidance tube 1 is fixed a coaxial tubular support 5 whereon is slidingly mounted the rear portions 6 of a sleeve 7 having a guidance support 8 engaged in a longitudinal groove 9 formed along tubular support 5 parallel to the axis thereof. Therefore sleeve 7 can slide along support 1 whilst remaining angularly fixed thereto. The rear portion 10 of sleeve 7 is fixed for example driven into a bushing 11 carrying internal teeth 12. Bushing 11 carries a ball race 13 in which are located balls 14 via which a control drum 15 is rotatably mounted on said bushing 11 and consequently on sleeve 7. This control drum 15 comprises a hub 16 engaged on the rear pivot 4 of micrometer screw 2, said hub being fixed to said pivot 4 by a screw represented schematically by the dotted line 17. The free end of pivot 4 is engaged in a control ratchet 18 contiguous with drum 15, said control ratchet not being described in greater detail because it can be produced in any known or adequate manner. Thus, when the ratchet 18 or control drum 15 is rotated micrometer screw 2 is also rotated, and is displaced axially in the guidance tube 1. Simultaneously drum 15 which is fixed to pivot 4 is axially displaced and drives the sleeve 7 to which it is axially fixed as a result of the coupling by bushing 11 and balls 14. Thus, to any axial movement of the micrometer screw 2 corresponds a simultaneous and identical axial movement of sleeve 7 which remains however angularly fixed.

In sleeve 7 is rotatably mounted a tubular member 19 coaxial to tubular support 5 and which is axially fixed to said sleeve 7. The axial holding and rotary guiding of tubular member 19 in sleeve 7 is assured by a ball bearing fixed to sleeve 7 and schematically represented as 20 and by a bearing 21. A portion 22 of tubular member 19 is arranged beneath a window 23 arranged in the sleeve wall 7 and against which is marked a reference line 24 (FIGS. 2 and 3).

On the periphery of portion 22 of tubular member 19 which is located facing window 23 are aligned one above the other all the successive numerals 25 (FIGS. 2 and 3) of the graduation units selected for indicating the measuring range of the instrument. However, it must be recalled that this arrangement is not limitative and that fractions of units, for example, tenths of units can also be aligned on portion 22 of tubular member 19. It must also be pointed out that although in the example described each of the numerals of the units only appear once (FIGS. 2 and 3), this arrangement is not limitative and that each of the numerals of the units can be repeated several times between the exact value of one unit and the following unit according to the dimensions given to these numerals.

The window 23 of sleeve 7 has dimensions such that at least three of the FIGS. 25 are simultaneously visible so as to avoid reading ambiguities during the passage from one numeral to the next.

Beside the numerals 25 the periphery of portion 22 of tubular member 19 has a marking 26 (FIGS. 2 and 3) consisting of a succession of saw tooth marks 27 arranged in such a way as to indicate the measuring range corresponding to each numeral of the units i.e., all the values between one unit numeral and the numeral of the following unit. Thus, with reference to FIG. 2 it can be seen that reference 24 is located adjacent to the top of saw tooth 27 corresponding to numeral 04 which indicates that the measurement effected by the instrument is slightly below five units, i.e., one is in the range of four units or four units plus a certain numer of fractions of one unit. It is important to note that the marking 26 is only provided to facilitate reading of the ranges corresponding to FIGS. 25 and does not constitute a means for estimating the fractions of said numerals. It is to be noted that in the case where each unit numeral is repeated several times each saw tooth mark 27 will correspond to all the numerals indicating the same unit. It should also be noted that the relative position of the saw tooth marks 27 cn be that shown in FIG. 2 i.e., the numeral is centred facing the saw tooth which starts and finishes therefore between two consecutive numerals or the saw tooth can be placed in such a way as to commence at the base of one numeral and finish at the base of the following numeral.

The inner wall of tubular member 19 is intersected by two helical grooves 28 and 29 which are diametrically opposite and whereof the pitch it equal to the measuring range of the instrument. In each of the helical grooves 28 and 29 is introduced a stud 30 which is axially and angularly fixed relative to tubular member 19. In the example described these studs 30 are diametrically opposed and respectively fixed on an elastic ring 31 located in tubular support 5 whereby the studs 30 each traverse the wall of said tubular support 5 to be located respectively in the helical groove 28 and 29. It is however obvious that this arrangement is not limitative and can be replaced by any other fixing method for the studs 30. Alternatively, as shown in FIG. 6, it is also possible to fix the studs 30 inside the tubular member 19 while the helical grooves 28 and 29 are arranged on tubular support 5. In the same way the pitch of the helical grooves can be larger than the measuring range of the instrument. As indicated hereinbefore the sleeve 7 is axially fixed to the micrometer screw 2 and follows the movements thereof whilst remaining angularly fixed. However the studs 30 are axially and angularly fixed and the tubular member 19 is axially fixed to sleeve 7 whilst remaining angularly free because it is rotatably mounted in said sleeve 7. Moreover the studs 30 are engaged in the helical grooves 28 and 29 of tubular member 19. It follows therefore if the sleeve 7 is axially displaced the tubular member 19 is also axially displaced. However the studs 30 are engaged in helical grooves 28 and 29 of tubular member 19 and said studs 30 cannot permit the axial displacement of the tubular member 19 except when they slide along the helical grooves 28 and 29. As the studs 30 are fixed their sliding in the helical groove has the effect of turning tubular member 19 about its axis. Given that the pitch of the helical grooves 28 and 29 is equal to the measuring range of the instrument the tubular member 19 performs a complete revolution about its axis for a displacement of the micrometer screw 2 equal to the measuring range of the instrument. All the FIGS. 25 of the graduation unit selected to indicate the measuring range of the instrument and which are aligned like marking 26 on the periphery of portion 22 of tubular member 19 and according to the particular case the numerals for the fractions of units will therefore pass in front of the window 23 and will permit the carrying out of a digital reading of the displacements of micrometer screw 2.

In addition to the reading system comprising tubular member 19 and marking 26 described hereinbefore the micrometer shown comprises a construction permitting the digital reading of fractions of the graduation unit selected to indicate the measuring range of the instrument. This construction does not form part of the invention but with a view to explaining the attached drawing said construction will be briefly described hereinafter.

On the hub 16 of control drum 15 is mounted in rotary manner a bushing 32 axially fixed to said hub 16, the assembly of bushing 32 on hub 16 being assured by a ball race schematically represented as 33. Bushing 32 has a hub 34 carrying peripheral teeth 35. On drum 15 is rotatably mounted a pinion 36 which is off centre relative to the axis of drum 15 and engages on the one hand with teeth 12 of bushing 11 fixed to sleeve 7 and on the other with peripheral teeth 35 of the hub of bushing 32. This system acts as a planet gear and when the drum 15 is rotated, pinion 36 is rotated about its axis in reverse direction due to its engagement with sleeve 12 which is fixed and also it drives rotary bushing 32 via teeth 35 in the same direction as drum 15 but at a different rotation speed.

Rotary bushing 32 carries in known manner a series of lateral arms 37 extending from the side of sleeves 7 wherein is located tubular member 19 and forming a type of cage and between which are mounted in rotary manner on spindles 38 prisms 39 with five faces. The prisms 39 are arranged concentrically relative to pivot 4 and their axes are located respectively tangential to an imaginary circle concentric to pivot 4. The rotating bushing 32 as well as the prisms 39 move in front of a window 40 arranged in the wall of sleeve 7 beside window 23. Window 40 has dimensions such that it permits the simultaneous appearance of the corresponding faces of several prisms 39.

On each of the faces of prisms 39 are marked two FIGS. 41 (FIG. 2) corresponding to fractions of units of the graduation selected for indicating the measurements performed by the instrument, for example, tenths and hundredths of units whilst rotary bushing 32 has lines 42 corresponding to fractions of the figures indicated on prisms 39 for example thousandths of units. The fixed bushing 11 has a reference line 43. As illustrated in FIG. 3 the faces of each of the prisms 39 can only carry a single numeral 44 corresponding to a fraction of the graduation unit whilst FIGS. 45 corresponding to another fraction of said units for example one hundredths of units can be marked on bushing 32 which also carries lines 42 serving as references for fractions of FIGS. 45.

On the hub 16 is mounted in a freely slidable manner with a certain radial play thereon a disc 46 the section of which is shaped so as to form a radial cam 47 concentric to pivot 4. This disc 46 is placed in the circular surface formed by the assembly of prisms 39 and the cam 47 is engaged with said prisms which it acts upon radially relative to the pivot 4. The dimensions of disc 46 are such that their is a certain play between the cam 47 and the prisms 39. The disc 46 has a lateral arm 48 which is slidingly engaged in a stop member 49 fixed to sleeve 7, said assembly being intended to prevent the rotation of disc 46 and therefore cam 47 whilst permitting it to have axial and radial tolerance relative to the pivot 4 and prisms 39.

Thus when rotary bushing 32 rotates it drives prisms 39 which slide along radial cam 47 which remains fixed. Prisms 39 therefore follow the profile of radial cam 47 which has the effect of rotating them. Depending on the rotation ratio selected for the rotary bushing 32 and the prisms 39, the number of prisms 39 and the number of faces thereof as well as the unit chosen it is possible to pass in front of window 40 and in front of marking 43 the successive numerals corresponding to the fractions of the units selected to indicate the displacement of the micrometer screw 2. In this way to each rotation of the micrometer screw 2 corresponds a sequence of numerals indicating for example tenths and hundredths of units the lines 42 of bushing 32 supplying in this case an indication of thousandths of units. Taking account of the possibilities of varying the rotation ratios between pivot 4, bushing 32 and prisms 39 and therefore the number of prisms 39 as well as the number of their faces can be chosen at random. The system can obviously be applied to all divisions of desired units in the same way as to both metric measurements and measurements in inches.

It is pointed out that the indication combination described either by means of the tubular member 19 and by the prisms 39 and the bushing 32 permits a digital reading in the normal reading direction, i.e., from left to right for the units and their fractions.

Obviously indication by tubular member 19 can also be used alone or in combination with other indication systems for the reading of fractions of units whether analog or digital.

Figure 4:
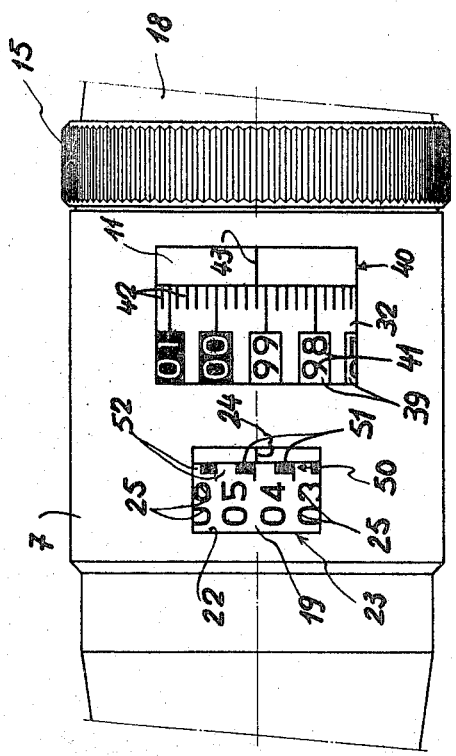
FIG. 4 represents the second embodiment viewed partially from above.

The micrometer shown in FIG. 4 has the same basic components as the micrometer shown in FIGS. 1 and 2. These components will not be described afresh and a description will be given solely of the members necessary for the understanding of the invention, whereby the members which have already been described will be given the same reference numerals.

The drawings show the sleeve 7 as well as the control drum 15 and ratchet 18. It is also possible to see the window 23 through which appears the periphery of portion 22 of tubular member 19 whereon are aligned one above the other all the numerals 25 of the graduation units selected to indicate the measuring range of the instrument as well as the reference line 24 opposite the window 23. Beside the latter appears the window 40 through which are visible the faces of prisms 39 whereon are marked the FIGS. 41 corresponding to the fractions of units made on tubular member 19 and appearing in window 23 in the form of tenths and hundredths of units. It is also possible to see the reference line 43 marked on the fixed bushing as well as the rotary bushing 32 whereon are marked the lines 42 corresponding to fractions of numbers indicated on prisms 39, in the example represented these are thousandths of units.

Beside the FIGS. 25, the periphery of portion 22 of tubular member 19 carries a marking 50 formed by a succession of marks forming over the complete periphery of portion 22 a continuous and repetitive alternation of contrasted zones separating in two the range of measurements corresponding to each figure of the units i.e., all the values extending from one unit figure to the figure of the following unit. Thus, with reference to the drawing it can be seen that each of the FIGS. 03, 04, 05, 06, the first half of the range of measurements is referenced by a black zone 51 whilst the second half of said range of measurements is referenced by a white zone 52, the whole constituted by a black zone 51 and a white zone 52 forming the totality of the range of measurements of each of said figures.

In accordance with the marking 50 of FIGS. 25 of the units the faces of prisms 39 are coloured black or white in such a way that the figures of the fractions of units, here tenths and hundredths of units, corresponding to the different ranges of figures of the units are visible on a base having the same colour as the portion of the range considered. Thus, if the first half of the range of measurements of the unit figures is referenced by a black zone, as is the case in the drawing, the faces of the prisms 39 which indicate the figures passing from zero to fifty hundredths are coloured black whilst the faces of the prisms carrying the figures from fifty hundredths to one hundred hundredths are white, thus corresponding to the colour of the zone referencing the second half of the range of measurements of the unit figures.

With reference to the drawing it can be seen that the reference line 24 of the unit figures is located facing the white zone 52 referencing the second half of the range of measurements of FIG. 04, whilst the reference line 43 of the figures of tenths and hundredths of units is also located facing a white zone, here ninety nine hundredths and two thousandths. In this way one has a simple and reliable means enabling avoidance of any ambiguity in the reading of the unit figures corresponding to the reading of the figures of fractions of units. Due to the fact that the colours of the zones read must correspond it is not possible to read the figure of the unit following the unit which should be read because there would be no correspondence between the colours of the zones read, the zone referencing the first half of the range of measurements of the following figure being black.

Although the marking 50 is represented by an alternation of zones 51 and 52 of generally rectangular form, this is not limitative and it is possible to modify these shapes. In the same way the alternation of colours for the referencing of the units and fractions thereof can use colours other than black and white given that all colours offering a sufficient contrast can be appropriately used. Finally, the ranges of measurements of units and the fractions of units corresponding thereto can be separated into two contrasted unequal zones or into a larger number of contrasted zones, for example, four contrasted zones separating each of the ranges of measurements of the units and passing respectively for tenths and hundredths from 0 to 25, 25 to 50, 50 to 75 and 75 to 100 hundredths. Naturally the alternation is continuous and repetitive for the units, i.e., the same sequence of contrasted colours is found for the range of measurements of each unit.

Figure 5:
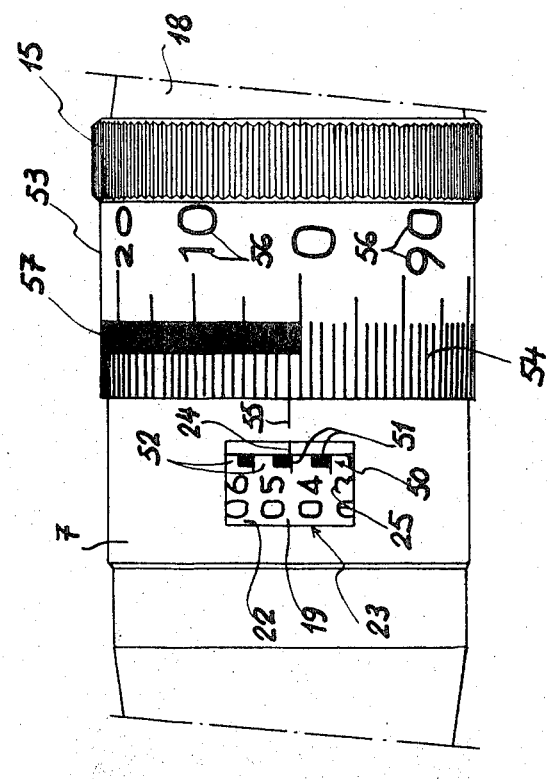
FIG. 5 represents the third embodiment viewed partially from above.

The embodiment shown in FIG. 5 has the same components for digital reading of units as in the previous example. However the component for the digital reading of fractions of units in this case hundredths and tenths is eliminated and replaced by an analog reading system comprising in known manner a rotary drum 53 fixed to control drum 15 and having a scale 54 containing one hundred divisions referenced by a reference line 55 marked on sleeve 7 and marked in tens by FIGS. 56. This type of analog reading drum which is known and will not be described in greater detail is represented solely to show the application of the invention to the analog reading of fractions of units.

As in the previous example the periphery of portion 22 of tubular member 19 serving for the indication of the units has beside FIGS. 25 a marking 50 formed by a succession of marks forming a continuous and repetitive alternation of contrasted zones separating into two the range of measurements corresponding to each unit figure, i.e., all the values between one unit figure and the following unit figure. The drawing shows, as hereinbefore the black zones 51 referencing the first half of the range of measurements of FIGS. 03, 04, 05 and 06 and the white zones 52 referencing the second half of said ranges of measurements, the totality formed by a black zone 51 and a white zone 52 forming the complete range of measurements of each of said figures.

In agreement with the marking 50 of FIGS. 25 of units the scale 54 of tenths and hundredths of units is coloured black and white in such a way that the divisions indicating the fractions of units corresponding to the different ranges of unit figures are marked with the same colour as the portion of the range considered. Thus, the first half of the range of measurements of unit figures is referenced by a black zone so that the divisions of scale 54 from zero to fifty hundredths are marked by a black band 57, whilst the divisions which correspond to the second half of the range of measurements of the unit figures referenced by a white zone are divisions passing from fifth to one hundred hundredths and will be on a white background.

In this way one has a simple means permiting the avoidance of ambiguities in the reading of unit figures corresponding with the analog reading of unit fractions. As in the case of digital reading of units and fractions of units, the form, colours, alternation thereof and number of contrasted zones can be modified.

What we claim is:

1. A micrometer with digital reading comprising:
   a. a movable micrometer screw threadedly engaged in a fixed support;
   b. a sleeve movably disposed on said fixed support, said sleeve axially fixed to said micrometer screw and angularly coupled to said fixed support;
   c. a tubular element rotatably positioned within said sleeve, said tubular element axially coupled to said sleeve for simultaneous longitudinal movement threwith, said tubular element also coupled ro said fixed support by at least a helical groove and a stud slidably introduced in said helical groove whereby any axial displacement of the sleeve upon actuation of the micrometer screw causes the rotation of the tubular element in said sleeve;
   d. at least a series of digits arranged on the periphery of said tubular element; and
   e. a window disposed in said sleeve for viewing said digits.

2. A micrometer according to claim 1, wherein said tubular element is positioned between said sleeve and said fixed support of the micrometer screw.

3. A micrometer according to claim 2, wherein said helical groove is disposed on the inner wall of said tubular element and wherein said stud is axially and angularly fixed to said fixed support of the micrometer screw.

4. A micrometer according to claim 2, wherein said helical groove is angularly and axially fixed to said fixed support of the micrometer screw and wherein said stud is fixed on the inner wall of said tubular element.

5. A micrometer according to claim 1, wherein the pitch of said helical groove is at least equal to the measuring range of the instrument.

6. A micrometer with digital reading comprising:
   a. a movable micrometer screw threadedly engaged in a fixed support;
   b. a sleeve movably disposed on said fixed support, said sleeve axially fixed to said micrometer screw and angularly coupled to said fixed support;
   c. a tubular element rotatably positioned within said sleeve, said tubular element axially coupled to said sleeve for simultaneous longitudinal movement therewith, said tubular element also coupled to said fixed support by at least a helical groove and a stud slidably introduced in said helical groove whereby any axial displacement of the sleeve upon actuation of the micrometer screw causes the rotation of the tubular element in said sleeve;
   d. at least a series of digits arranged on the periphery of said tubular element;
   e. a window disposed in said sleeve for viewing said digits; and
   f. a marking disposed on the periphery of said tubular element beside said digits, said marking including a series of marks each indicating the range of values comprised between one digit and the next digit above or below.

7. A micrometer according to claim 6, wherein said marking is constituted by a succession of marks in the form of saw teeth, each of which saw teeth is arranged facing one of said digits.

8. A micrometer with digital reading comprising:
   a. a movable micrometer screw threadedly engaged in a fixed support;
   b. a sleeve movably disposed on said fixed support, said sleeve axially fixed to said micrometer screw and angularly coupled to said fixed support;
   c. a tubular element rotatably positioned within said sleeve, said tubular element axially coupled to said sleeve for simultaneous longitudinal movement therewith, said tubular element also coupled to said fixed support by at least a helical groove and a stud slidably introduced in said helical groove whereby any axial displacement of the sleeve upon actuation of the micrometer screw causes the rotation of the tubular element in said sleeve;
   d. at least a series of digits arranged on the periphery of said tubular element;
   e. a window disposed in said sleeve for viewing said digits;
   f. means for the reading of fractions of the values indicated by said digits;
   g. a first marking disposed on the periphery of said tubular element beside said digits, said first marking separating into at least two separate portions the range of values corresponding to each digit; and
   h. a second marking disposed on said means for the reading of fractions of the values indicated by said digits, said second marking differentiating said fractions in the same way as the portion of the range of values to which they correspond.

9. A micrometer according to claim 8, wherein said first marking comprises a succession of marks forming a continuous and repetitive alternation of contrasted zones, and wherein said second marking is constituted by a corresponding contrasting of said means for the reading of fractions.

* * * * *